(12) United States Patent
Eaton et al.

(10) Patent No.: US 11,797,747 B1
(45) Date of Patent: Oct. 24, 2023

(54) IDENTIFYING REDUNDANT LOGIC BASED ON CLOCK GATE ENABLE CONDITION

(71) Applicant: Cadence Design Systems, Inc., San Jose, CA (US)

(72) Inventors: Matthew David Eaton, Stow-cum-Quy (GB); George Simon Taylor, Round Rock, TX (US); Zhuo Li, Austin, TX (US); James Youren, Cambridge (GB); Ji Xu, Cambridge (GB)

(73) Assignee: Cadence Design Systems, Inc., San Jose, CA (US)

( * ) Notice: Subject to any disclaimer, the term of this patent is extended or adjusted under 35 U.S.C. 154(b) by 164 days.

(21) Appl. No.: 17/410,837

(22) Filed: Aug. 24, 2021

Related U.S. Application Data

(60) Provisional application No. 63/202,173, filed on May 28, 2021.

(51) Int. Cl.
*G06F 9/455* (2018.01)
*G06F 30/398* (2020.01)
*G06F 117/04* (2020.01)

(52) U.S. Cl.
CPC ........ *G06F 30/398* (2020.01); *G06F 2117/04* (2020.01)

(58) Field of Classification Search
USPC .................................. 716/104, 106, 110, 111
See application file for complete search history.

(56) References Cited

U.S. PATENT DOCUMENTS

| | | | |
|---|---|---|---|
| 7,210,082 B1 * | 4/2007 | Abdel-Hafez | ............................... G01R 31/318307 714/E11.167 |
| 10,936,774 B1 * | 3/2021 | Katzir | ..................... G06F 30/20 |
| 2019/0179766 A1 * | 6/2019 | Venkatasubramanian | ................... G06F 9/4552 |

FOREIGN PATENT DOCUMENTS

| | | | | | |
|---|---|---|---|---|---|
| CN | 107111623 A | * | 8/2017 | ........... | G06F 3/0608 |
| JP | 2010055292 A | * | 3/2010 | | |

* cited by examiner

*Primary Examiner* — Brian Ngo
(74) *Attorney, Agent, or Firm* — Schwegman Lundberg and Woessner, P.A.

(57) ABSTRACT

Various embodiments provide for determining redundant logic in a circuit design based on one or more enable conditions of clock gates, which can be part of electronic design automation (EDA). In particular, some embodiments use one or more enable conditions (of the clock gates) with a satisfiability solver to determine redundant logic coupled to clock circuit elements gated by the clock gates.

20 Claims, 10 Drawing Sheets

US 11,797,747 B1

IDENTIFYING REDUNDANT LOGIC BASED ON CLOCK GATE ENABLE CONDITION

CLAIM OF PRIORITY

This application claims the benefit of priority under 35 U.S.C. § 119(e) to U.S. Patent Application Ser. No. 63/202,173, filed on May 28, 2021, which is incorporated by reference herein in its entirety.

TECHNICAL FIELD

Embodiments described herein relate to circuit design and, more particularly, to systems, methods, devices, and instructions for identifying redundant logic in a circuit design based on clock gate enable conditions, which can be part of electronic design automation (EDA).

BACKGROUND

As a part of designing a circuit, such as an integrated circuit (IC), an EDA software system commonly performs generation of a clock distribution network (also referred to as a clock tree), which uses a branching network to distribute a clock signal from a clock signal source to a plurality of clocked circuit elements (or clock sinks) within a circuit design. The clocked circuit elements usually comprise circuit devices in the circuit design that are designed to be clocked and thus need a clock signal to operate. Examples of clocked circuit elements include flip-flops or other sequential circuit devices that rely on a clock signal to synchronize their operations. A clocked circuit element can receive a clock signal via a clock pin included by the clocked circuit element.

BRIEF DESCRIPTION OF THE DRAWINGS

Various ones of the appended drawings merely illustrate example embodiments of the present disclosure and should not be considered as limiting its scope.

DETAILED DESCRIPTION

Figure 1:
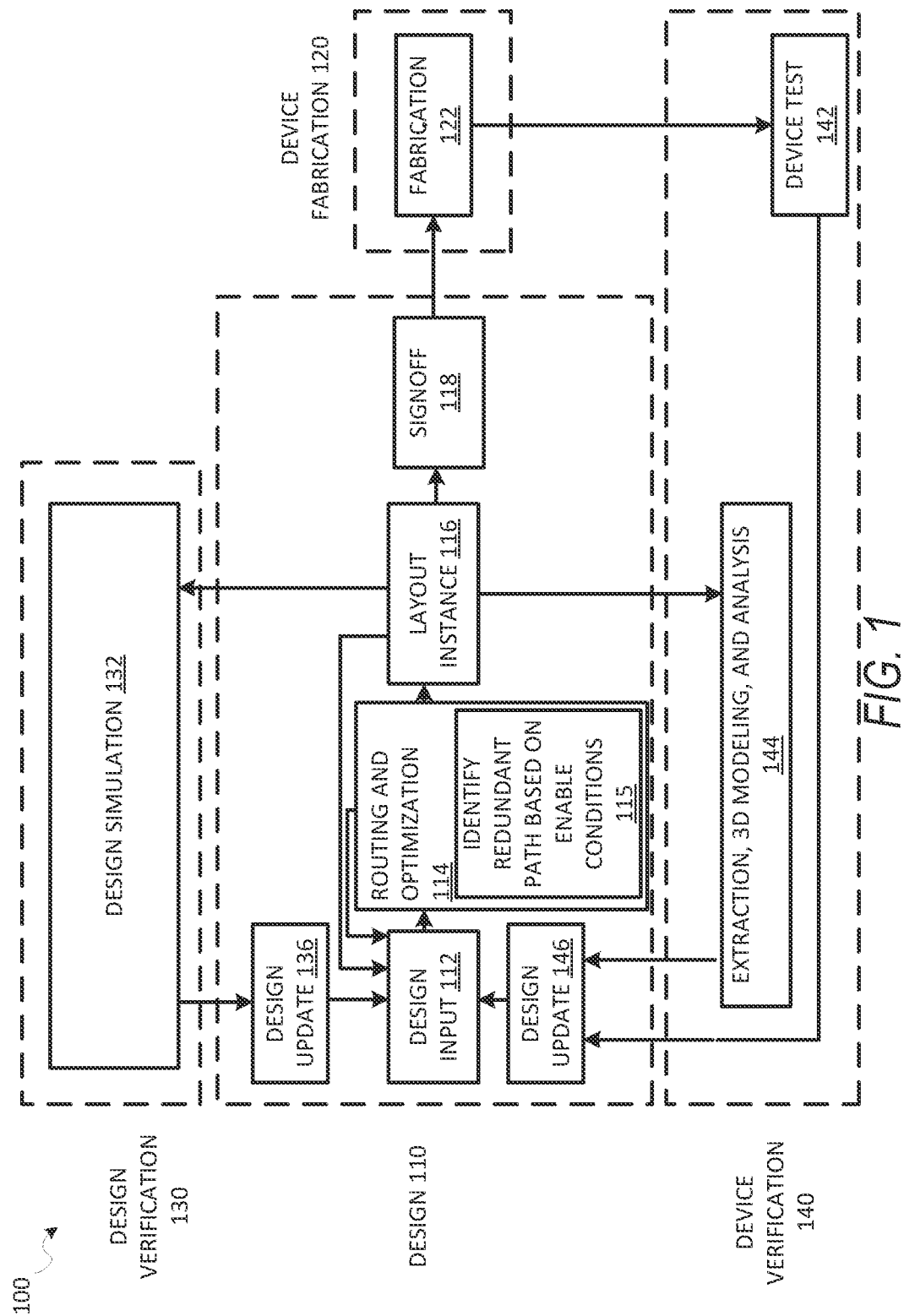
FIG. 1 is a diagram illustrating an example design process flow for determining redundant logic in a circuit design based on one or more enable conditions of clock gates, according to some embodiments.

Various embodiments provide for identifying redundant logic in a circuit design based on one or more enable conditions of clock gates, which can be part of EDA. In particular, some embodiments use one or more enable conditions (of the clock gates) with a satisfiability solver to identify redundant logic coupled to clock circuit elements gated by the clock gates.

Generally, nodes of a clock network can comprise a clock-gate or integrated clock gate (ICG), in the path from a clock source to a clock pin of a circuit element, to turn off a cluster of clock pins if the cluster is not required for certain operations of the final circuit for the active operation of the IC. In this way, the ICG can permit the final circuit to save power that would otherwise be consumed by the cluster had it not been gated from the clock tap by the ICG.

Generally, the enable signal of a clock gate is extracted from existing logic in the data path. After implementing the clock gate in a circuit design, some of this logic can become redundant, where the redundant logic always evaluates to a constant value or generates a signal that is unobservable at the flop-flops when the flop-flop is enabled (e.g., when the clock gate is enabled and the flip-flop is being clocked). Sometimes the redundant logic to be removed can be obvious and easily determined such as, where a binary multiplexer serving as a recirculation multiplexer around a flip-flop can be used to deduce a clock gating enable condition (up to an inversion of the select line of the multiplexer). In such an example, the multiplexer can be determined to be redundant logic after clock gating. However, with more complex feedback conditions (e.g., feedback logic that has several feedback paths through it), it can be more difficult to identify such redundant logic.

Various embodiments described herein can enable or facilitate identifying redundant logic from a circuit design based on one or more enable conditions of clock gates and can remove such redundant logic from the circuit design (e.g., by replacing a redundant logic path with a path that provides the input with an asserted constant logic value). Some embodiments annotate logic within a circuit design with observability conditions derived from enable conditions of clock gates that control clock signals to (e.g., that gate) clocked circuit elements (e.g., flip-flops) that have that logic in their fan-in cone. Using the observability conditions, a satisfiability solver (or sat solver) can be used to prove whether at least some portion of the logic can be replaced by a constant (logic 0 or logic 1) or can be removed. For instance, an embodiment can determine (e.g., compute) a global observability condition based on enable conditions of clock gates that control clock signals to clocked circuit elements (e.g., downstream flip-flops), where a signal is observable downstream by at least one of the clocked circuit elements when the at least one of the clocked circuit elements is operating (e.g., the at least one of the clocked circuit elements is currently receiving a clock signal). In this way, various embodiments can analyze downstream logic to determine which clocked circuit elements capture the signal.

Use of various embodiments described herein can result in a reduced logic path depth to clocked circuit elements (e.g., reduced depth of logic in fan-in cone of a flip-flop), and can result in fewer feedback logic paths after clock gating. Depending on the embodiment, methodologies described herein can be performed after, or as part of, a process that adds one or more clock gates to a clock network or a process that declones clock gates.

As used herein, an enable signal can be coupled to an input (e.g., pin) of a clock gate that controls whether the clock gate is enabled or disabled. A given enable signal for a given clock gate can cause the given clock gate to be enabled when a enable condition for the given clock gate (e.g., where the enable condition is implemented by logic in a circuit design) is satisfied. An enable condition for a clock gate can also be referred to herein as a clock gate enable condition. Two different clock gates can have two different enable conditions. For some embodiments, when a given clock gate is enabled, a cluster of circuit elements coupled to the clock gate receive a clock signal via the given clock gate. When a given clock gate is disabled, a cluster of circuit elements coupled to the clock gate does not receive a clock signal via the given clock gate. As used herein, where a clocked circuit element receives a clock signal from a clock gate, the clock signal is considered to be controlled by the clock gate and the clocked circuit element is considered to be gated by the clock gate.

Examples combinational logic gate can include, without limitation, OR logic gates, AND logic gates, XOR logic gates, NOR logic gates, and NAND logic gates.

As used herein, a satisfiability solver (or sat solver) can comprise a Boolean satisfiability solver, such as one part of a SimSat solver. In general, a sat solver can prove conclusively if a logic proposition is satisfiable (e.g., does there exist a choice of variable values for which the proposition evaluates to true) or unsatisfiable (e.g., the proposition evaluates to false for all combinations of variable values).

For example, a sat solver can determine whether a set of enable conditions (EN) for a clock gate would result in the fan-out of a combination logic gate (Z) receiving a constant signal (e.g., logic value of 1 or 0). In this case the sat solver can attempt to prove that either of the propositions: (a)~(Z & EN); or (b)~(~Z & EN) are unsatisfiable. If proposition (a) is unsatisfiable, Z is constant 1 under condition EN, and if proposition (b) is unsatisfiable, Z is constant 0 under EN, and if neither are unsatisfiable Z is not constant under EN.

As used herein, decloning two or more clock gates of a circuit design comprises modifying the circuit design such that one clock gate can replace the two or more clock gates in the circuit design and can gate the clusters of clock pins previously controlled by the two or more clock gates. By replacing the two or more clock gates with the one clock gate, the decloning process can effectively merge the two or more clock gates into the one clock gate.

Reference will now be made in detail to embodiments of the present disclosure, examples of which are illustrated in the appended drawings. The present disclosure may, however, be embodied in many different forms and should not be construed as being limited to the embodiments set forth herein.

FIG. 1 is a diagram illustrating an example design process flow 100 for identifying redundant logic in a circuit design based on one or more enable conditions of clock gates, according to some embodiments. As shown, the design process flow includes a design phase 110, a device fabrication phase 120, a design verification phase 130, and a device verification phase 140. The design phase 110 involves an initial design input 112 operation where the basic elements and functionality of a device are determined, as well as revisions based on various analyses and optimization of a circuit design. This design input 112 operation is where block instances are used in the circuit design and any additional circuitry for the design around the blocks is selected. The initial strategy, tactics, and context for the device to be created are also generated in the design input 112 operation, depending on the particular design algorithm to be used.

In some embodiments, following an initial selection of design values in the design input 112 operation, routing, timing analysis, and optimization are performed in a routing and optimization 114 operation, along with any other automated design processes. As shown, the routing and optimization 114 operation includes an identify redundant path based on enable conditions 115 operation (hereafter, determine redundant path 115 operation), which may be performed in accordance with various embodiments described herein. The determine redundant path 115 operation can identify redundant logic in a circuit design based on one or more enable conditions of clock gates as described herein and can remove the redundant logic from the circuit design (e.g., removing a redundant logic path and replacing it with a path that provides an input with a constant logic value of 1 or 0, as appropriate).

For some embodiments, the determine redundant path 115 operation comprises performing one or more of the following operations. Initially, the determine redundant path 115 operation can identify all clock gates within a clock network of a circuit design, label each of the identified clock gates with a unique clock gate label, and associate an enable condition (clock gate enable condition) of each of the identified clock gates with its respective, unique clock gate label. A given enable condition associated with a given clock gate label can represent an observability condition for each of the clocked circuit elements (e.g., flip-flops) that the given clock gate gates. Next, the determine redundant path 115 operation can identify all clocked circuit elements (e.g., flip-flops), each identified clocked circuit element that is gated by an individual clock gate can be assigned the clock gate label of individual clock gate, and each identified clocked circuit element that is not gated by any clock gates (e.g., ungated) is assigned an ungated label. If there are multiple levels of clock gates and an individual clocked circuit element is gated by a chain of clock gates in the multiple levels of clock gates, a new clock gate label can be generated for the chain of clock gates and can be assigned to the individual clocked circuit element. By assigning an individual clock gate label to an individual clocked circuit element (e.g., flip-flop), the individual clock gate label can be assigned to an input (e.g., D input of the flip-flop) of the individual clocked circuit element coupled to an output of another circuit element (e.g., a combinational logic gate, such as an OR logic gate, an AND logic gate, a XOR logic gate, a NOR logic gate, or a NAND logic gate) that drives a signal to the input. This can eventually be used to determine (e.g., evaluate) whether a path (e.g., data or logic path) between the output of the other circuit element and the input of the individual clocked circuit element are redundant based on an enable condition (clock gate enable condition) associated with the individual clock gate label assigned to the input of the individual clocked circuit element. During the determine redundant path 115 operation, one or more of the following can be assumed to be ungated in the circuit design and can be assigned an ungated label: all module outputs; all asynchronous inputs; and inputs on non-combinational logic gate, non-flip-flop instances.

After assigning labels to circuit elements, the determine redundant path 115 operation can start a depth-first search process (or variation thereof) starting from each clocked circuit element of the circuit design. At each output of a combinational logic gate of the circuit design encountered during the depth-first search, for each individual input coupled to the output (driven by the combinational logic gate) and assigned a clock gate label, the determine redundant path 115 operation can use a satisfiability solver (or sat solver) to determine (e.g., prove) whether a proposition exists for an enable condition (of the clock gate label) that causes the output to be a constant value, such as a logic value of 1 or 0. For instance, a sat solver can be used to determine whether for a input T, enable conditions (EN1+ . . . +ENn)=>(T==1) and, if so, replace T's driver with 1'b1, and a SimSat process can be used to determine whether for input T, enable conditions (EN1+ . . . +ENn)>(T==0) and, if so, replace T's driver with 0'b1. If the sat solver determines that a proposition exists, the determine redundant path 115 operation can determine the path between the output and the individual input to be redundant, replace the path with a path that provides T with the constant value (e.g., logic value 0 or 1), and propagate (backwards) an ignore label (e.g., a "Don't Care" or DC label) from the individual input to the output. For instance, where the proposition exists that causes the output to be a constant logic value of 0, the path can be replaced with a path that provides the input with a constant logic value of 0, and where the proposition exists that causes the output to be a constant logic value of 1, the path can be replaced with a path that provides the input with a constant logic value of 1 (1'b1). If, however, the sat solver determines that a proposition does not exist, the determine redundant path 115 operation can determine that the path is not redundant and can propagate (backwards) the clock gate label of the individual input from the individual input to the output. After the determine redundant path 115 has processed each individual input coupled to the output as described above, the determine redundant path 115 can assign a label to the output of the other circuit element (e.g., the combinational logic gate) based on the labels propagated (backwards) to the output from one or more inputs coupled to the output. For instance, where there are multiple labels propagated (backwards) to the output, the labels can be combined (e.g., according to a combination rule) to determine a combined label that is assigned to the output. The combination rule can include, without limitation: combining a clock gate label and an ungated label to result in a combined label that comprises the ungated label; combining a clock gate label and an ignore label (e.g., a Don't Care" or DC label) to result in a combined label that comprises the clock gate label; and combining a first clock gate label (e.g., associated with an enable condition X) and a second clock gate label (e.g., associated with an enable condition Y) to result in a combined label that comprises a new clock gate label associated with a combined enable condition of the first and second clock gate labels (e.g., combined enable condition comprising (enable condition X+ enable condition Y), where '+' represent an logical OR operation). Where there is only a single individual input coupled to the output, the output can be assigned the single label propagated (backwards) to the output from the single individual input.

After the determine redundant path 115 has assigned a label to the output of the other circuit element (e.g., the combinational logic gate), the depth-first search process can eventually reach each input of the other circuit element and the determine redundant path 115 can assign the label of the output to each of those inputs, thereby propagating (backwards) the label of the output.

While the design process flow 100 shows optimization occurring prior to a layout instance 116, routing, timing analysis and optimization may be performed at any time to verify operation of a circuit design. For instance, in various embodiments, timing analysis in a circuit design may be performed prior to routing of connections in the circuit design, after routing, during register transfer level (RTL) operations, or as part of a signoff 118, as described below.

After design inputs are used in the design input 112 operation to generate a circuit layout, and any of the routing and optimization 114 operations are performed, a layout is generated in the layout instance 116. The layout describes the physical layout dimensions of the device that match the design inputs. Prior to this layout being provided to a fabrication 122 operation, the signoff 118 is performed on the circuit design defined by the layout.

After signoff verification by the signoff 118, a verified version of the layout is used in the fabrication 122 operation to generate a device, or additional testing and design updates may be performed using designer inputs or automated updates based on design simulation 132 operations or extraction, three-dimensional (3D) modeling, and analysis 144 operations. Once the device is generated, the device can be tested as part of device test 142 operations and layout modifications generated based on actual device performance.

As described in more detail below, a design update 136 from the design simulation 132; a design update 146 from the device test 142 or the extraction, 3D modeling, and analysis 144 operations; or the design input 112 operation may occur after the initial layout instance 116 is generated. In various embodiments, whenever design inputs are used to update or change an aspect of a circuit design, a timing analysis and the routing and optimization 114 operation may be performed.

Figure 2:
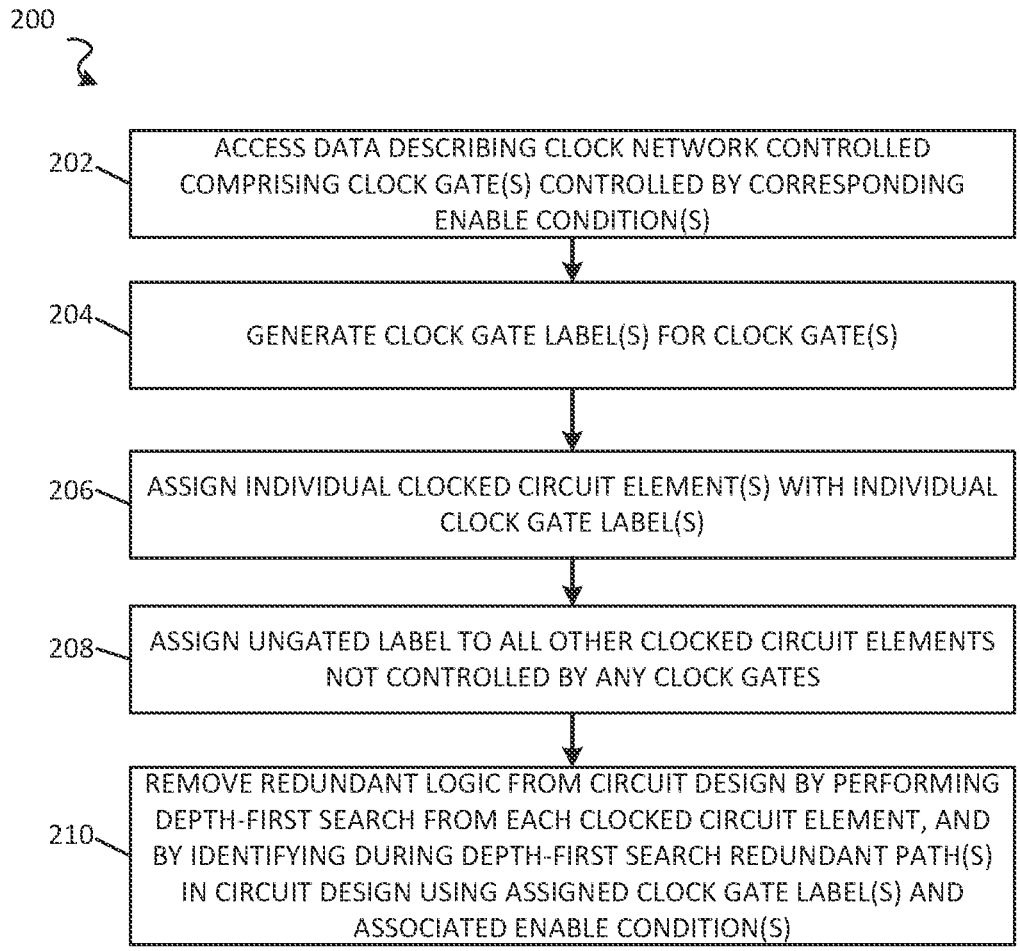
FIG. 2 is a flowchart illustrating an example method for determining redundant logic in a circuit design based on one or more enable conditions of clock gates, according to some embodiments.

FIG. 2 is a flowchart illustrating an example method for identifying redundant logic in a circuit design based on one or more enable conditions of clock gates, according to some embodiments. It will be understood that example methods described herein may be performed by a device, such as a computing device executing instructions of an EDA software system, in accordance with some embodiments. Additionally, example methods described herein may be implemented in the form of executable instructions stored on a computer-readable medium or in the form of electronic circuitry. For instance, the operations of a method 200 of FIG. 2 may be represented by executable instructions that, when executed by a hardware processor of a computing device, cause the computing device to perform the method 200. Depending on the embodiment, an operation of an example method described herein may be repeated in different ways or involve intervening operations not shown. Though the operations of example methods may be depicted and described in a certain order, the order in which the operations are performed may vary among embodiments, including performing certain operations in parallel. Depending on the embodiment, the method 200 can be performed after, or as part of, a clock gate decloning process that has been applied to a clock network of a circuit design, such as a process that declones clock gates based on detecting duplicate enable logic for clock gates.

Referring now to FIG. 2, operation 202 accesses data that describes a clock network of a circuit design, where the clock network comprises a set of clock gates controlled by a corresponding set of enable conditions, and where the set of clock gates controls (e.g., gates) clock signals to a set of clocked circuit elements (e.g., flip-flops) of the circuit design. As noted herein, an enable signal can be coupled to an input (e.g., pin) of a clock gate that controls whether the clock gate is enabled or disabled, and the enable signal can cause the clock gate to be enabled when an enable condition for the clock gate (e.g., where the enable condition is implemented by logic in the circuit design) is satisfied. A clocked circuit element, such as a flip-flop, is coupled to the clock network of the circuit design.

At operation 204, a set of clock gate labels is generated for the set of clock gates. For some embodiments, operation 204 comprises performing the following for each individual clock gate in the set of clock gates: assigning a clock gate label to the individual clock gate; and associating the clock gate label with an individual enable condition (from the corresponding set of enable conditions) for the individual clock gate. For various embodiments, each assigned clock gate label is unique to the clock gate to which it is assigned.

Thereafter, at operation 206, for each individual clocked circuit element in the set of clocked circuit elements, a select label (from the set of clock gate labels generated by operation 204) is assigned to the individual clocked circuit element, where the select label corresponds to (e.g., is assigned to) a select clock gate that controls (e.g., gates) a clock signal to the individual clocked circuit element. If the there is a multiple level of clock gates in the clock network and an individual clocked circuit element is gated by a chain of clock gates in the clock network, a new clock gate label can be generated for the chain of clock gates and can be assigned to the individual clocked circuit element. Additionally, at operation 208, an ungated label is assigned to all other clocked circuit elements (e.g., all other flip-flops in the circuit design) that are not controlled (e.g., not gated) by any clock gates. Depending on the embodiment, all module outputs, asynchronous inputs, and inputs on instances (that are not combinational logic gates or flip-fops) can be considered ungated and can be labeled as part of operation 208.

Figure 3:
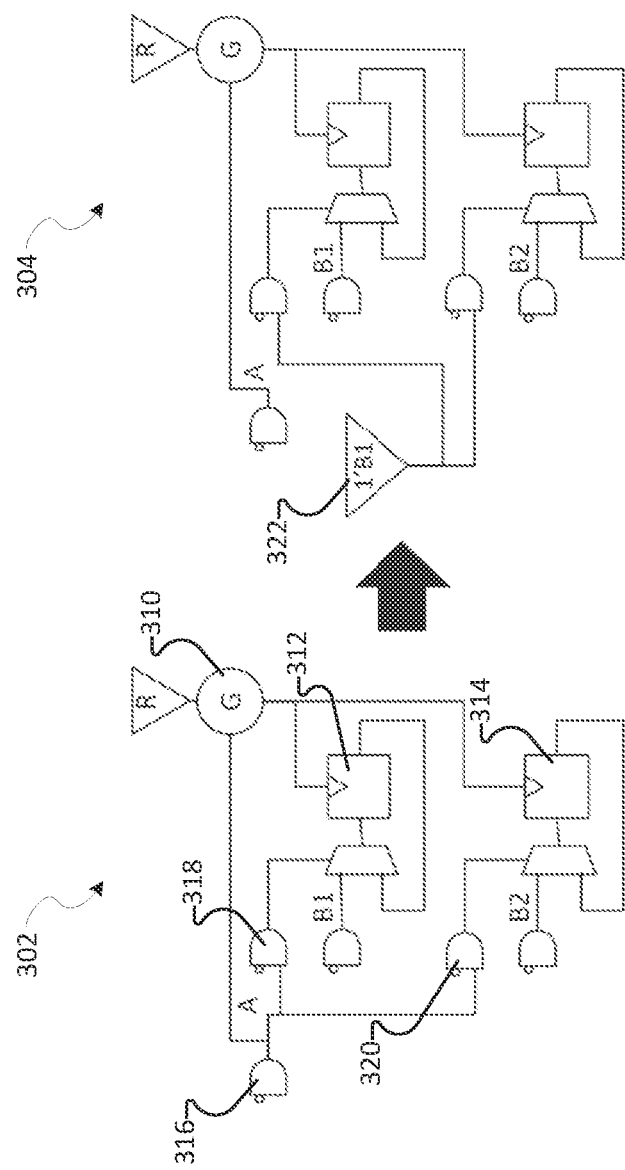
FIG. 3 shows circuit diagrams that illustrate an example of determining redundant logic in a circuit design based on one or more enable conditions of clock gates, according to some embodiments.

At operation 210, redundant logic is removed from the circuit design by performing a depth-first search (or a variation thereof) of the circuit design starting from each clocked circuit element of the circuit design, and by determining (during the depth-first search) one or more redundant paths in the circuit design using one or more assigned clock gate labels (e.g., initially assigned by operation 206) and one or more associated enable conditions (e.g., associated with clock gate labels during operation 204). In particular, operation 210 can perform the depth-first search of the circuit design starting from each clocked circuit element of the circuit design. At each combinational logic gate of the circuit design encountered during the depth-first search, for each input coupled to an output of the combinational logic gate, operation can determine whether a path between the output and the input is redundant based on an associated enable condition of an associated clock gate label of the input, reassign the input from the associated clock gate label to an ignore label in response to determining that the path is redundant (thereby propagating the ignore label to the output), and leave assignment of the associated clock gate label to the input unchanged in response to determining that the path is not redundant (thereby propagating the associated clock gate label to the output). For some embodiments, operation 210 determines whether the path between the output and the input is redundant based on the associated enable condition of the associated clock gate label by: using a sat solver to determine whether there exists a logical proposition where the associated enable condition causes the input to have a constant value; and in response to determining that the logical proposition exists, determining that the path is redundant. Subsequently, an output label is assigned to the output based on one or more current labels of (e.g., labels propagated from) any inputs coupled to the output. In response to determining that the path is redundant, operation 210 can remove the path. For instance, the path can be removed by replacing the path with a path that provides the input with a constant logic value, such as a logic value 0 or 1 (an example of which is illustrated by FIG. 3). In doing so, eventually a combinational logic gate having an output that is assigned an ignore (e.g., a "Don't Care" or DC label) no longer outputs to (e.g., drives) any inputs and can be removed. After the output label is assigned to the output, operation 210 can propagate the output label to each input of the combinational logic gate.

For some embodiments, where the one or more current labels comprise at least one ungated label, the assigning of the output label based on the one or more current labels (propagated labels) results in the output label being the ungated label. In this way, the one or more current labels can be combined to result in the ungated label. For some embodiments, where the one or more current labels comprise at least one ignore label, no ungated labels, and one or more existing clock gate labels, the assigning of the output label based on the one or more current labels results in the output label being a new clock gate label that is associated with a combined enable condition, where the combined enable condition comprises a combination of each enable condition associated with the one or more existing clock gate labels (e.g., each enabled condition logically OR'd together). In this way, the one or more current labels can be combined to result in the new clock gate label. For some embodiments, where the one or more current labels comprise at least one ignore label, no ungated labels, and only one existing clock gate label, the assigning of the output label based on the one or more current labels results in the output label being the only existing clock gate label. In this way, the one or more current labels can be combined to result in the one existing clock gate label.

FIG. 3 shows circuit diagrams that illustrate an example of identifying redundant logic in a circuit design 302 based on one or more enable conditions of clock gates, according to some embodiments. As shown, the circuit design 302 comprises a clock gate 310, which gates a flip-flop 312 and a flip-flop 314. A method described herein can determine that a redundant path exists between a combinational logic gate 316 and a combinational logic gate 318, and that a redundant path exists between the combinational logic gate 316 and a combinational logic gate 320. As a result, the method can replace each of those paths with paths that provide the respective inputs with a constant logic value 1'bl (322), as shown by a circuit design 304.

Figure 4:
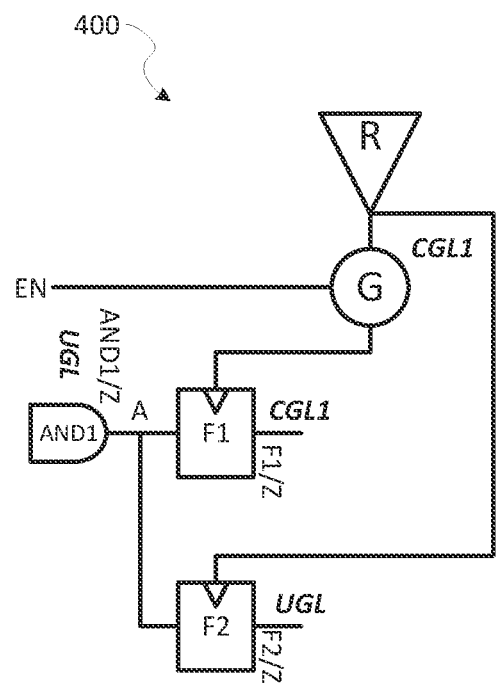
FIGS. 4 through 6 are circuit diagrams illustrating examples of combining assigned labels, according to some embodiments.
Figure 5:
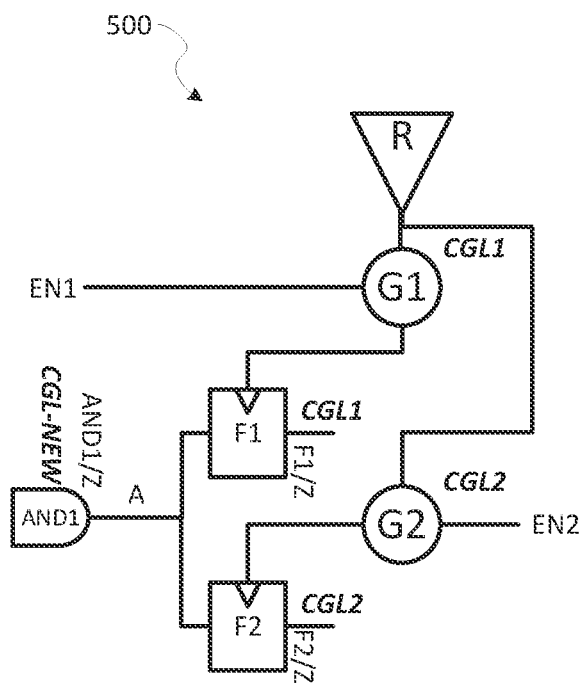
Figure 6:
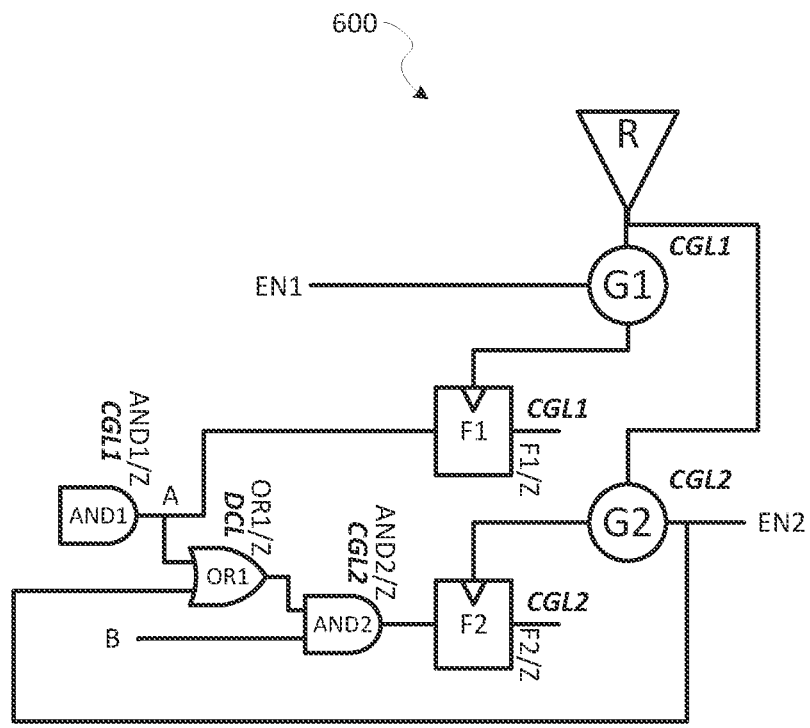

FIGS. 4 through 6 are circuit diagrams illustrating examples of combining assigned labels, according to some embodiments. Referring now to FIG. 4, a circuit diagram 400 comprises a clock source R, a clock gate G controlled by an enable signal EN, a flip-flop F1 having an input F1/A and an output F1/Z, a flip-flop F2 having an input F2/A and an output F2/Z, and an AND logic gate AND1 having an output AND1/Z. As shown, the clock gate G gates only the flip-flop F1, the output AND1/Z drives the input F1/A of the flip-flop F1, and the output AND1/Z drives the input F2/A of the flip-flop F2. When the enable signal EN1 is high (e.g., logical value of 1), the flip-flop F1 observes signal A from the AND gate AND1 and the flip-flop F2 observes signal A from the AND gate AND1. According to various embodiments, the clock gate G is assigned a clock gate label CGL1 and, as a result, the flip-flop F1 is assigned the clock gate label CGL1. The flip-flop F2 is not gated by any clock gates and, as a result, the flip-flop F2 is assigned an ungated label UGL. In response to determining (e.g., using a sat solver and the enable signal EN) that the path between the output AND1/Z and the input F1/A is not redundant, the clock gate label CGL1 is propagated to the output AND1/Z. In response to determining that the path between the output AND1/Z and the input F2/A is not redundant (e.g., by seeing that the label on F2/A is UGL and therefore cannot be redundant), the ungated label UGL is propagated to the output AND1/Z. According to some embodiments, based on combining the clock gate label CGL1 from the input F1/A and the ungated label UGL from the input F2/A, the output AND1/Z is assigned the ungated label UGL.

Referring now to FIG. 5, a circuit diagram 500 comprises a clock source R, a clock gate G1 controlled by an enable signal EN1, a clock gate G2 controlled by an enable signal EN2, a flip-flop F1 having an input F1/A and an output F1/Z, a flip-flop F2 having an input F2/A and an output F2/Z, and an AND logic gate AND1 having an output AND1/Z. As shown, the clock gate G1 gates the flip-flop F1, the clock gate G2 gates the flip-flop F2, the output AND1/Z drives the input F1/A of the flip-flop F1, and the output AND1/Z drives the input F2/A of the flip-flop F2. When the enable signal EN1 is high (e.g., logical value of 1), the flip-flop F1 observes signal A from the AND gate AND1, and when the enable signal EN2 is high (e.g., logical value of 1), the flip-flop F2 observes signal A from the AND gate AND1. According to various embodiments, the clock gate G1 is assigned a clock gate label CGL1 and, as a result, the flip-flop F1 is assigned the clock gate label CGL1. The clock gate G2 is assigned a clock gate label CGL2 and, as a result, the flip-flop F2 is assigned the clock gate label CGL2. In response to determining (e.g., using a sat solver and the enable signal EN1) that the path between the output AND1/Z and the input F1/A is not redundant, the clock gate label CGL1 is propagated to the output AND1/Z. Similarly, in response to determining (e.g., using a sat solver and the enable signal EN2) that the path between the output AND1/Z and the input F2/A is not redundant, the clock gate label CGL2 is propagated to the output AND1/Z. According to some embodiments, based on combining the clock gate label CGL1 from the input F1/A and the clock gate label CGL2 from the input F2/A, the output AND1/Z is assigned a new clock gate label CGL-NEW that is associated with a combined enable conditions (e.g., (EN1+EN2)) of the clock gate label CGL1 and the clock gate label CGL2.

Referring now to FIG. 6, a circuit diagram 600 comprises a clock source R, a clock gate G1 controlled by an enable signal EN1, a clock gate G2 controlled by an enable signal EN2, a flip-flop F1 having an input F1/A and an output F1/Z, a flip-flop F2 having an input F2/A and an output F2/Z, an AND logic gate AND1 having an output AND1/Z, an AND logic gate AND2 having an output AND2/Z, and an OR logic gate OR1 having an input OR1/A, an input OR1/B, and an output OR1/Z. As shown, the clock gate G1 gates the flip-flop F1, the clock gate G2 gates the flip-flop F2, the output AND1/Z drives the input F1/A of the flip-flop F1, the output AND1/Z drives the input OR1/A of the OR gate OR1, the output OR1/Z drives an input of the AND gate AND2, and the output AND2/Z drives the input F2/A of the flip-flop F2. When the enable signal EN1 is high (e.g., logical value of 1), the flip-flop F1 observes signal A from the AND gate AND1, and when the enable signal EN2 is high and the signal B is high (e.g., logical value of 1), the flip-flop F2 observes signal A from the AND gate AND1. According to various embodiments, the clock gate G1 is assigned a clock gate label CGL1 and, as a result, the flip-flop F1 is assigned the clock gate label CGL1. The clock gate G2 is assigned a clock gate label CGL2 and, as a result, the flip-flop F2 is assigned the clock gate label CGL2. According to some embodiments, eventually the path between the OR gate OR1 and the AND gate AND2 is determined to be redundant, the OR gate OR1 is assigned a "Don't Care" label, and the "Don't Care" label DCL is propagated to the input OR1/A. For some embodiments, based on combining the clock gate label CGL1 from the input F1/A and the "Don't Care" label DCL from the input OR1/A, the output AND1/Z is assigned the clock gate label CGL1.

Figure 7A:
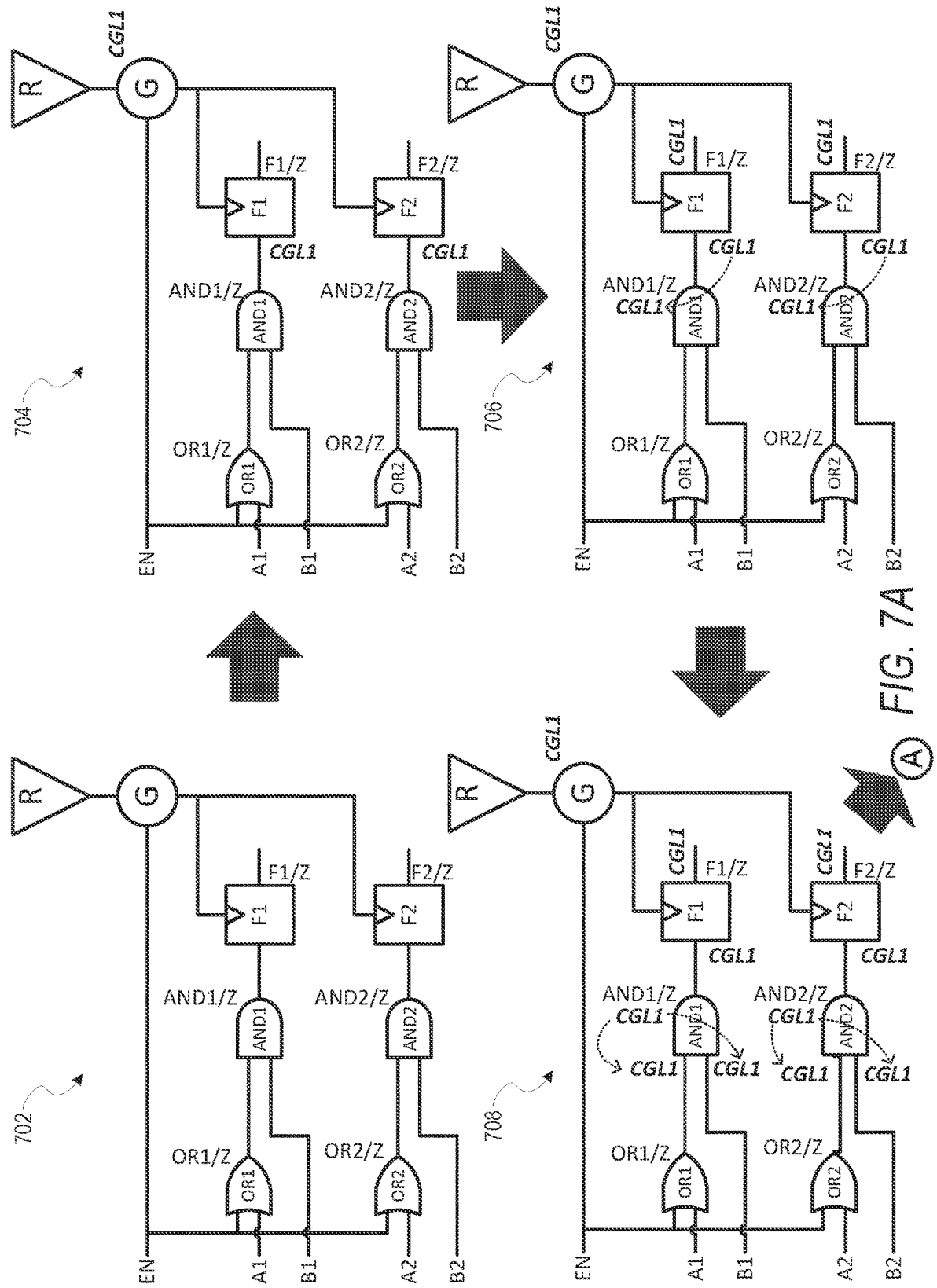
FIGS. 7A and 7B illustrate an example of applying a method for determining redundant logic in a circuit design based on one or more enable conditions of clock gates, according to some embodiments.
Figure 7B:
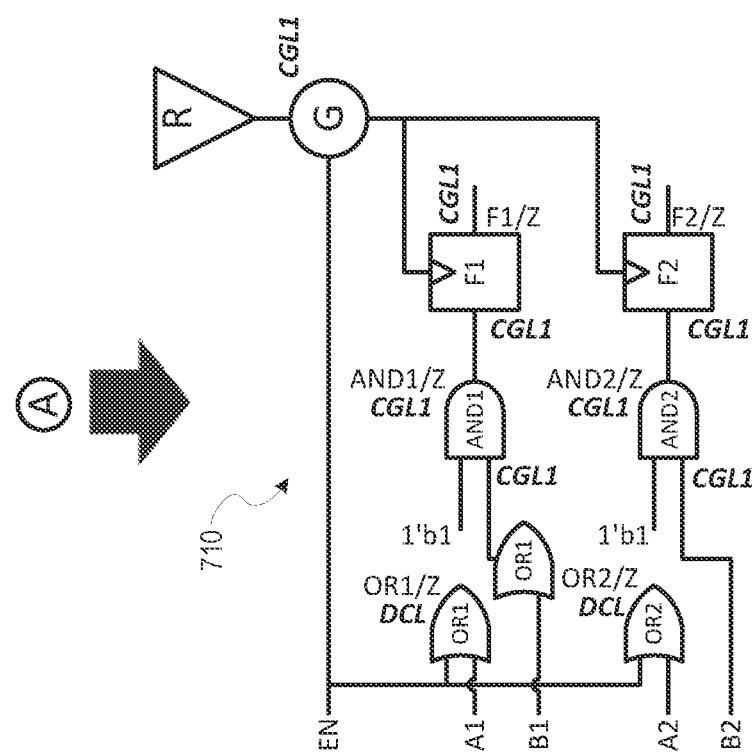

FIGS. 7A and 7B illustrate an example of applying a method for identifying redundant logic in a circuit design based on one or more enable conditions of clock gates, according to some embodiments. Referring now to FIG. 7A, as shown at 702, the circuit design comprises a clock gate G controlled by an enable signal EN, a flip-flop F1 that is gated by the clock gate G, a flip-flop F2 that is gated by the clock gate G, a AND logic gate AND1 that drives an input (e.g., D input) of the flip-flop F1, a AND logic gate AND2 that drives an input (e.g., D input) of the flip-flop F2, an OR logic gate OR1 drives an input AND1/A of the AND logic gate AND1, a signal B1 drives an input AND1/B of the AND logic gate AND1, an OR logic gate OR2 drives an input AND2/A of the AND logic gate AND2, and a signal B2 drives an input AND2/B of the AND logic gate AND2. The enable signal EN and a signal A1 respectively drive inputs OR1/A and OR1/B of the OR gate OR1, and the enable signal EN and a signal A2 respectively drive inputs OR2/A and OR2/B of the OR gate OR2.

At 704, the method assigns the clock gate G with a clock gate label CGL1, which is associated with an enable condition of the clock gate G and where the enable condition comprises the enable signal EN. Each of the flip-flops F1 and F2 (specifically, their respective inputs) are assigned the clock gate label CGL1 based on the clock gate G gating the two flip-flops. Based on the clock gate label CGL1 being assigned to the input of the flip-flop F1, and the flip-flop F1 being driven by the AND gate AND1, the method determines that a logical proposition does not exist for the enable condition (e.g., the enable signal EN) that causes the input of the flip-flop F1 to be constant value (e.g., logic value of 0 or 1), so an output AND1/Z of the AND gate AND1 is assigned the clock gate CGL1 (at 706), which is then propagated to the inputs AND1/A and AND1/B of the AND gate AND1 (as shown at 708).

The input AND1/A, which is assigned the clock gate CGL1, is driven by an output OR1/Z of the OR gate OR1. In response to the method determining that a logical proposition does exist for the enable condition (e.g., the enable signal EN) that causes the input of the input AND1/A to be constant logic value of 1, the method can replace the path coupling the output OR1/Z to the input AND1/A with a path that provides the constant value of 1'b1. Additionally, a "Don't Care" label DCL can be propagated back from the input AND1/A to the output OR1/Z. This is shown at 710 of FIG. 7B.

Figure 8:
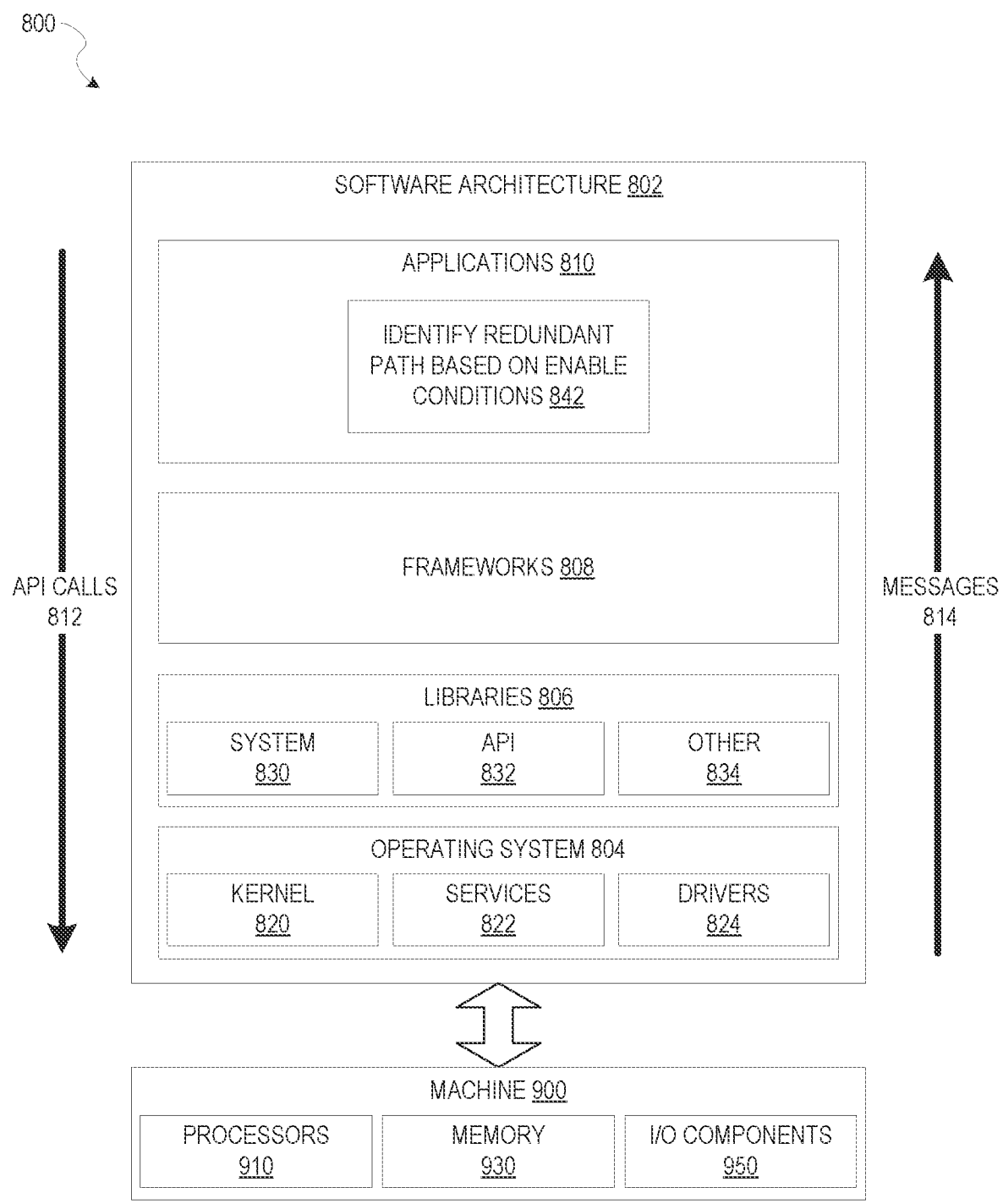
FIG. 8 is a block diagram illustrating an example of a software architecture that may be operating on an EDA computing device and may be used with methods for determining redundant logic in a circuit design based on one or more enable conditions of clock gates, according to some embodiments.

FIG. 8 is a block diagram 800 illustrating an example of a software architecture 802 that may be operating on an EDA computer and may be used with methods for identifying redundant logic in a circuit design based on one or more enable conditions of clock gates, according to some example embodiments. The software architecture 802 can be used as an EDA computing device to implement any of the methods described above.

FIG. 8 is merely a non-limiting example of a software architecture 802, and it will be appreciated that many other architectures can be implemented to facilitate the functionality described herein. In various embodiments, the software architecture is implemented by hardware such as a machine 900 of FIG. 9 that includes processors 910 (e.g., hardware processors), memory 930, and I/O components 950. In this example, the software architecture 802 can be conceptualized as a stack of layers where each layer may provide a particular functionality. For example, the software architecture 802 includes layers such as an operating system 804, libraries 806, software frameworks 808, and applications 810. Operationally, the applications invoke application programming interface (API) calls 812 through the software stack and receive messages 814 in response to the API calls 812, consistent with some embodiments. In various embodiments, any client device, any server computer of a server system, or any other device described herein may operate using elements of the software architecture 802. An EDA computing device described herein may additionally be implemented using aspects of the software architecture 802, with the software architecture 802 adapted for identifying redundant logic in a circuit design in any manner described herein.

In one embodiment, an EDA application of the applications 810 identifies redundant logic in a circuit design based on one or more enable conditions of clock gates according to embodiments described herein using various modules within the software architecture 802. For example, in one embodiment, an EDA computing device similar to the machine 900 includes the memory 930 and the one or more processors 910. The processors 910 also implement a determine redundant path based on enable conditions module 842 for identifying redundant logic in a circuit design based on one or more enable conditions of clock gates in accordance with various embodiments described herein.

In various other embodiments, rather than being implemented as modules of the one or more applications 810, the determine redundant path based on enable conditions module 842 may be implemented using elements of the libraries 806, the operating system 804, or the software frameworks 808.

In various implementations, the operating system 804 manages hardware resources and provides common services. The operating system 804 includes, for example, a kernel 820, services 822, and drivers 824. The kernel 820 acts as an abstraction layer between the hardware and the other software layers, consistent with some embodiments. For example, the kernel 820 provides memory management, processor management (e.g., scheduling), component management, networking, and security settings, among other functionality. The services 822 can provide other common services for the other software layers. The drivers 824 are responsible for controlling or interfacing with the underlying hardware, according to some embodiments. For instance, the drivers 824 can include display drivers, signal-processing drivers to optimize modeling computation, memory drivers, serial communication drivers (e.g., Universal Serial Bus (USB) drivers), WI-FI® drivers, audio drivers, power management drivers, and so forth.

In some embodiments, the libraries 806 provide a low-level common infrastructure utilized by the applications 810. The libraries 806 can include system libraries 830 such as libraries of blocks for use in an EDA environment or other libraries that can provide functions such as memory allocation functions, string manipulation functions, mathematic functions, and the like. In addition, the libraries can include API libraries 832 such as media libraries (e.g., libraries to support presentation and manipulation of various media formats such as Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 806 may also include other libraries 834.

The software frameworks 808 provide a high-level common infrastructure that can be utilized by the applications 810, according to some embodiments. For example, the software frameworks 808 provide various graphical user interface (GUI) functions, high-level resource management, high-level location services, and so forth. The software frameworks 808 can provide a broad spectrum of other APIs that can be utilized by the applications 810, some of which may be specific to a particular operating system 804 or platform. In various embodiments, the systems, methods, devices, and instructions described herein may use various files, macros, libraries, and other elements of an EDA design environment to implement identification of redundant logic in a circuit design based on one or more enable conditions of clock gates as described herein. This includes analysis of input design files for an integrated circuit design, along with any element of hierarchical analysis that may be used as part of or along with the embodiments described herein. While netlist files, library files, SDC files, and view definition files are examples that may operate within the software architecture 802, it will be apparent that other files and structures may provide a similar function, in various embodiments.

Certain embodiments are described herein as including logic or a number of components, modules, elements, or mechanisms. Such modules can constitute either software modules (e.g., code embodied on a machine-readable medium or in a transmission signal) or hardware modules. A "hardware module" is a tangible unit capable of performing certain operations and can be configured or arranged in a certain physical manner. In various example embodiments, one or more computer systems (e.g., a standalone computer system, a client computer system, or a server computer system) or one or more hardware modules of a computer system (e.g., a processor or a group of processors) are configured by software (e.g., an application or application portion) as a hardware module that operates to perform certain operations as described herein.

In some embodiments, a hardware module is implemented mechanically, electronically, or any suitable combination thereof. For example, a hardware module can include dedicated circuitry or logic that is permanently configured to perform certain operations. For example, a hardware module can be a special-purpose processor, such as a field-programmable gate array (FPGA) or an application-specific integrated circuit (ASIC). A hardware module may also include programmable logic or circuitry that is temporarily configured by software to perform certain operations. For example, a hardware module can include software encompassed within a general-purpose processor or other programmable processor. It will be appreciated that the decision to implement a hardware module mechanically, in dedicated and permanently configured circuitry, or in temporarily configured circuitry (e.g., configured by software) can be driven by cost and time considerations.

Accordingly, the phrase "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software can accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between or among such hardware modules may be achieved, for example, through the storage and retrieval of information in memory structures to which the multiple hardware modules have access. For example, one hardware module performs an operation and stores the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors. Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines 900 including processors 910), with these operations being accessible via a network (e.g., the Internet) and via one or more appropriate interfaces (e.g., an API). In certain embodiments, for example, a client device may relay or operate in communication with cloud computing systems and may access circuit design information in a cloud environment.

The performance of certain of the operations may be distributed among the processors, not only residing within a single machine 900, but deployed across a number of machines 900. In some example embodiments, the processors 910 or processor-implemented modules are located in a single geographic location (e.g., within a home environment, an office environment, or a server farm). In other example embodiments, the processors or processor-implemented modules are distributed across a number of geographic locations.

Figure 9:
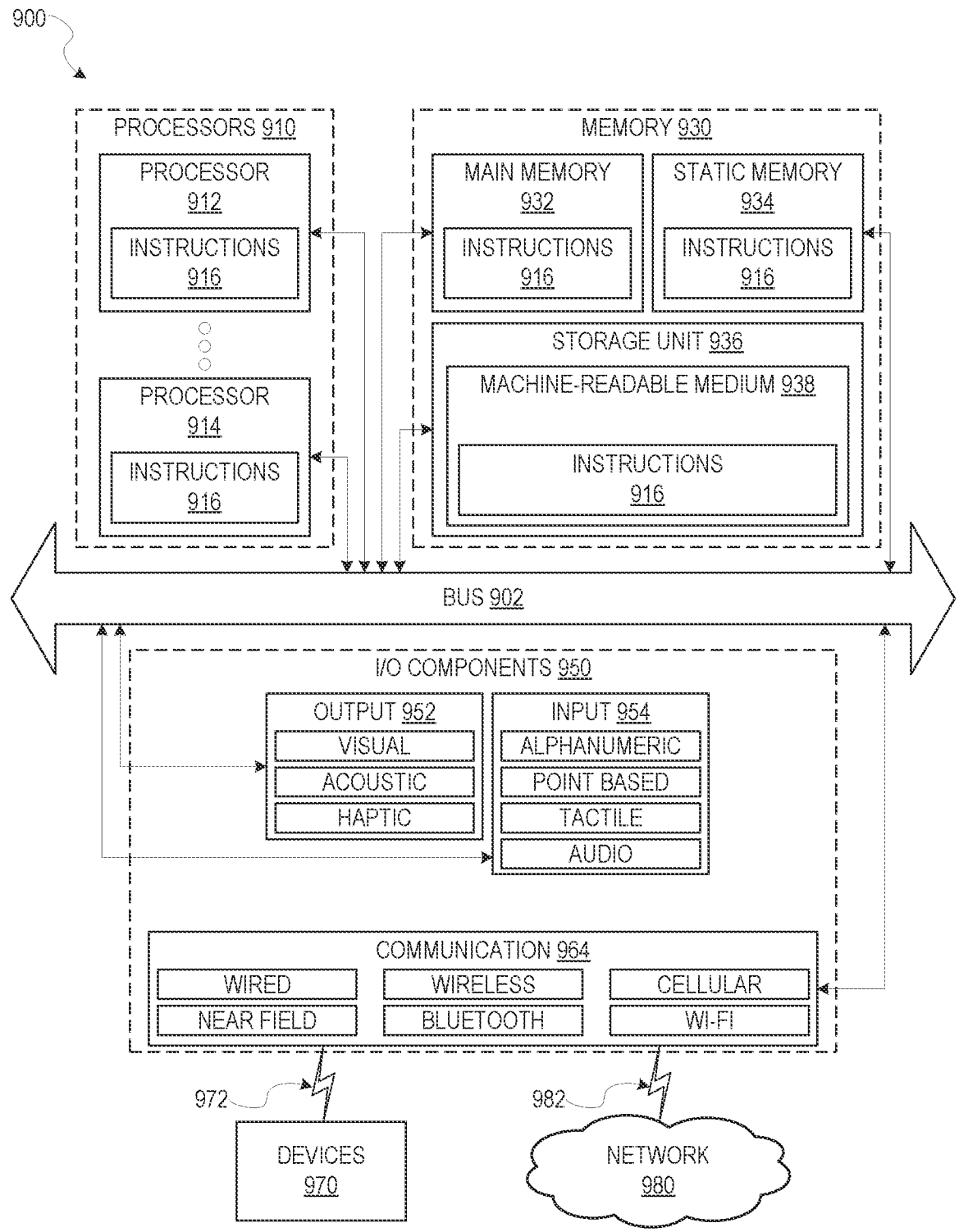
FIG. 9 is a diagram representing a machine in the form of a computer system within which a set of instructions are executed, causing the machine to perform any one or more of the methods discussed herein, according to some example embodiments.

FIG. 9 is a diagrammatic representation of the machine 900 in the form of a computer system within which a set of instructions may be executed for causing the machine 900 to perform any one or more of the methodologies discussed herein, according to an example embodiment. FIG. 9 shows components of the machine 900, which is, according to some embodiments, able to read instructions from a machine-readable medium (e.g., a machine-readable storage medium) and perform any one or more of the methodologies discussed herein. Specifically, FIG. 9 shows a diagrammatic representation of the machine 900 in the example form of a computer system, within which instructions 916 (e.g., software, a program, an application, an applet, an app, or other executable code) for causing the machine 900 to perform any one or more of the methodologies discussed herein can be executed. In alternative embodiments, the machine 900 operates as a standalone device or can be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 can comprise, but not be limited to, a server computer, a client computer, a personal computer (PC), a tablet computer, a laptop computer, a netbook, or any machine capable of executing the instructions 916, sequentially or otherwise, that specify actions to be taken by the machine 900. Further, while only a single machine 900 is illustrated, the term "machine" shall also be taken to include a collection of machines 900 that individually or jointly execute the instructions 916 to perform any one or more of the methodologies discussed herein.

In various embodiments, the machine 900 comprises processors 910, memory 930, and input/output (110) components 950, which can be configured to communicate with each other via a bus 902. In an example embodiment, the processors 910 (e.g., a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), another processor, or any suitable combination thereof) include, for example, a processor 912 and a processor 914 that may execute the instructions 916. The term "processor" is intended to include multi-core processors 910 that may comprise two or more independent processors 912, 914 (also referred to as "cores") that can execute the instructions 916 contemporaneously. Although FIG. 9 shows multiple processors 910, the machine 900 may include a single processor 912 with a single core, a single processor 912 with multiple cores (e.g., a multi-core processor 912), multiple processors 910 with a single core, multiple processors 910 with multiple cores, or any combination thereof.

The memory 930 comprises a main memory 932, a static memory 934, and a storage unit 936 accessible to the processors 910 via the bus 902, according to some embodiments. The storage unit 936 can include a machine-readable medium 938 on which are stored the instructions 916 embodying any one or more of the methodologies or functions described herein. The instructions 916 can also reside, completely or at least partially, within the main memory 932, within the static memory 934, within at least one of the processors 910 (e.g., within the processor's cache memory), or any suitable combination thereof, during execution thereof by the machine 900. Accordingly, in various embodiments, the main memory 932, the static memory 934, and the processors 910 are considered machine-readable media 938.

As used herein, the term "memory" refers to a machine-readable medium 938 able to store data temporarily or permanently and may be taken to include, but not be limited to, random-access memory (RAM), read-only memory (ROM), buffer memory, flash memory, and cache memory. While the machine-readable medium is shown, in an example embodiment, to be a single medium, the term "machine-readable medium" should be taken to include a single medium or multiple media (e.g., a centralized or distributed database, or associated caches and servers) able to store the instructions 916. The term "machine-readable medium" shall also be taken to include any medium, or combination of multiple media, that is capable of storing instructions (e.g., the instructions 916) for execution by a machine (e.g., the machine 900), such that the instructions, when executed by one or more processors of the machine (e.g., the processors 910), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 950 include a wide variety of components to receive input, provide output, produce output, transmit information, exchange information, capture measurements, and so on. In general, it will be appreciated that the I/O components 950 can include many other components that are not shown in FIG. 9. The I/O components 950 are grouped according to functionality merely for simplifying the following discussion, and the grouping is in no way limiting. In various example embodiments, the I/O components 950 include output components and input components 954. The output components 952 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 954 include alphanumeric input components (e.g., a keyboard, a touch screen configured to receive alphanumeric input, a photo-optical keyboard, or other alphanumeric input components), point-based input components (e.g., a mouse, a touchpad, a trackball, or other pointing instruments), tactile input components (e.g., a physical button, a touch screen that provides location and force of touches or touch gestures, or other tactile input components), audio input components (e.g., a microphone), and the like.

In some embodiments, outputs from an EDA computing device may include design documents, files for additional steps in a design flow, or outputs for circuit fabrication. As described herein, "constraints," "requirements," "design elements," and other aspects of a circuit design refer to selectable values that are set as part of the design of a circuit. Such design constraints, requirements, or elements may be adjusted by a system operator or circuit designer to suit the particular goals of a project or circuit that results from the operations described herein.

Communication can be implemented using a wide variety of technologies. The I/O components 950 may include communication components 964 operable to couple the machine 900 to a network 980 or devices 970 via a coupling 982 and a coupling 972, respectively. For example, the communication components 964 include a network interface component or another suitable device to interface with the network 980. In further examples, the communication components 964 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 970 may be another machine or any of a wide variety of peripheral devices (e.g., a peripheral device coupled via a USB).

In various example embodiments, one or more portions of the network 980 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 980 or a portion of the network 980 may include a wireless or cellular network, and the coupling 982 may be a Code Division Multiple Access (CDMA) connection, a Global System for Mobile communications (GSM) connection, or another type of cellular or wireless coupling.

Furthermore, the machine-readable medium 938 is non-transitory (in other words, not having any transitory signals) in that it does not embody a propagating signal. However, labeling the machine-readable medium 938 "non-transitory" should not be construed to mean that the machine-readable medium 938 is incapable of movement; the machine-readable medium 938 should be considered as being transportable from one physical location to another. Additionally, since the machine-readable medium 938 is tangible, the machine-readable medium 938 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The detailed description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. The terms "a" or "an" should be read as meaning "at least one," "one or more," or the like. The use of words and phrases such as "one or more," "at least," "but not limited to," or other like phrases shall not be read to mean that the narrower case is intended or required in instances where such broadening phrases may be absent.

Boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The description above includes systems, methods, devices, instructions, and computer media (e.g., computing machine program products) that embody illustrative embodiments of the disclosure. In the description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

What is claimed is:

1. A non-transitory computer-readable medium comprising instructions that, when executed by a hardware processor of a device, cause the device to perform operations comprising:

accessing data that describes a clock network of a circuit design, the clock network comprising a set of clock gates controlled by a corresponding set of enable conditions, the set of clock gates controlling clock signals to a set of clocked circuit elements of the circuit design;

generating a set of clock gate labels for the set of clock gates by, for each individual clock gate in the set of clock gates:
      assigning a clock gate label to the individual clock gate; and
      associating the clock gate label with an individual enable condition, from the corresponding set of enable conditions, for the individual clock gate;

for each individual clocked circuit element in the set of clocked circuit elements, assigning a select label from the set of clock gate labels to the individual clocked circuit element, the select label corresponding to a select clock gate that controls a clock signal to the individual clocked circuit element;

assigning an ungated label to all other clocked circuit elements that are not controlled by any clock gates; and removing redundant logic from the circuit design by performing a depth-first search of the circuit design starting from each clocked circuit element of the circuit design.

2. The non-transitory computer-readable medium of claim 1, wherein at each combinational logic gate of the circuit design encountered during the depth-first search:

for each input coupled to an output of the combinational logic gate:
      determining whether a path between the output and the input is redundant based on an associated enable condition of an associated clock gate label of the input; and
      in response to determining that the path is redundant, removing the path and reassigning the input from the associated clock gate label to an ignore label; and
   assigning an output label for the output based on one or more current labels of any inputs coupled to the output.

3. The non-transitory computer-readable medium of claim 2, wherein in response to determining that the path is redundant, replacing the path with another path that provides the input with a constant logic value.

4. The non-transitory computer-readable medium of claim 2, wherein at each combinational logic gate of the circuit design encountered during the depth-first search:

after the output label is assigned, propagating the output label to each input of the combinational logic gate.

5. The non-transitory computer-readable medium of claim 2, wherein the combinational logic gate comprises at least one of an OR logic gate, an AND logic gate, a XOR logic gate, a NOR logic gate, or a NAND logic gate.

6. The non-transitory computer-readable medium of claim 2, wherein the one or more current labels comprise at least one ungated label, and wherein the assigning of the output label based on the one or more current labels results in the output label being the ungated label.

7. The non-transitory computer-readable medium of claim 2, wherein the one or more current labels comprise at least one ignore label, no ungated labels, and one or more existing clock gate labels, wherein the assigning of the output label based on the one or more current labels results in the output label being a new clock gate label that is associated with a combined enable condition, and wherein the combined enable condition comprises a combination of each enable condition associated with the one or more existing clock gate labels.

8. The non-transitory computer-readable medium of claim 2, wherein the one or more current labels comprise at least one ignore label, no ungated labels, and only one existing clock gate label, wherein the assigning of the output label based on the one or more current labels results in the output label being the only one existing clock gate label.

9. The non-transitory computer-readable medium of claim 2, wherein the determining of whether the path between the output and the input is redundant based on the associated enable condition of the associated clock gate label comprises:

using a sat solver to determine whether there exists a logical proposition where the associated enable condition causes the input to have a constant value; and
   in response to determining that the logical proposition exists, determining that the path is redundant.

10. The non-transitory computer-readable medium of claim 9, wherein the constant value comprises a logic value of one or zero.

11. The non-transitory computer-readable medium of claim 2, wherein in response to determining that the path is not redundant, maintaining assignment of the associated clock gate label to the output.

12. The non-transitory computer-readable medium of claim 1, wherein at least one clocked circuit element in the set of clocked circuit elements comprises a flip-flop.

13. The non-transitory computer-readable medium of claim 12, wherein all other clocked circuit elements comprises at least one instance of the circuit design that is not a flip-flop or a combination logic gate.

14. A method comprising:
   generating, by a hardware processor, a set of clock gate labels for a set of clock gates of a circuit design, the set of clock gates controlling clock signals to a set of clocked circuit elements of the circuit design, the set of clock gates being controlled by a corresponding set of enable conditions, the generating of the set of clock gate labels comprising, for each individual clock gate in the set of clock gates:
      assigning a clock gate label to the individual clock gate; and
      associating the clock gate label with an individual enable condition, from the corresponding set of enable conditions, for the individual clock gate;
   for each individual clocked circuit element in the set of clocked circuit elements, assigning, by the hardware processor, a select label from the set of clock gate labels to the individual clocked circuit element, the select label corresponding to a select clock gate that controls a clock signal to the individual clocked circuit element;
   assigning, by the hardware processor, an ungated label to all other clocked circuit elements that are not controlled by any clock gates; and
   removing, by the hardware processor, redundant logic from the circuit design by performing a depth-first search of the circuit design starting from each clocked circuit element of the circuit design, at each combinational logic gate of the circuit design encountered during the depth-first search:
      for each input coupled to an output of the combinational logic gate:
         determining whether a path between the output and the input is redundant based on an associated enable condition of an associated clock gate label of the input; and
         in response to determining that the path is redundant, removing the path and reassigning the input from the associated clock gate label to an ignore label; and
      assigning an output label for the output based on one or more current labels of any inputs coupled to the output.

15. The method of claim 14, wherein in response to determining that the path is redundant, replacing the path with another path that provides the input with a constant logic value.

16. The method of claim 14, wherein the one or more current labels comprise at least one ungated label, and wherein the assigning of the output label based on the one or more current labels results in the output label being the ungated label.

17. The method of claim 14, wherein the one or more current labels comprise at least one ignore label, no ungated labels, and one or more existing clock gate labels, wherein the assigning of the output label based on the one or more current labels results in the output label being a new clock gate label that is associated with a combined enable condition, and wherein the combined enable condition comprises a combination of each enable condition associated with the one or more existing clock gate labels.

18. The method of claim 14, wherein the one or more current labels comprise at least one ignore label, no ungated labels, and only one existing clock gate label, wherein the assigning of the output label based on the one or more current labels results in the output label being the only one existing clock gate label.

19. The method of claim 14, wherein the determining of whether a path between the output and the input is redundant based on an associated enable condition of the associated clock gate label comprises:
   using a sat solver to determine whether there exists a logical proposition where the associated enable condition causes the input to have a constant value; and
   in response to determining that the logical proposition exists, determining that the path is redundant.

20. A device comprising:
   a memory storing instructions; and
   a hardware processor communicatively coupled to the memory and configured by the instructions to perform operations comprising:
      generating a set of clock gate labels for a set of clock gates of a circuit design, the set of clock gates controlling clock signals to a set of clocked circuit elements of the circuit design, the set of clock gates being controlled by a corresponding set of enable conditions, the generating of the set of clock gate labels comprising, for each individual clock gate in the set of clock gates:
         assigning a clock gate label to the individual clock gate; and
         associating the clock gate label with an individual enable condition, from the corresponding set of enable conditions, for the individual clock gate;
      for each individual clocked circuit element in the set of clocked circuit elements, assigning a select label from the set of clock gate labels to the individual clocked circuit element, the select label corresponding to a select clock gate that controls a clock signal to the individual clocked circuit element; and
      removing redundant logic from the circuit design by performing a depth-first search of the circuit design starting from each clocked circuit element of the circuit design, and by identifying one or more redundant paths in the circuit design, during the depth-first search, using one or more assigned clock gate labels and one or more associated enable conditions.

* * * * *